US008660188B2

(12) United States Patent
Chiba

(10) Patent No.: US 8,660,188 B2
(45) Date of Patent: Feb. 25, 2014

(54) VARIABLE LENGTH CODING APPARATUS, AND METHOD AND INTEGRATED CIRCUIT OF THE SAME

(75) Inventor: Takuma Chiba, Osaka (JP)

(73) Assignee: Panasonic Corporation, Osaka (JP)

( * ) Notice: Subject to any disclaimer, the term of this patent is extended or adjusted under 35 U.S.C. 154(b) by 978 days.

(21) Appl. No.: 12/376,497

(22) PCT Filed: Jul. 31, 2007

(86) PCT No.: PCT/JP2007/064987
§ 371 (c)(1),
(2), (4) Date: Feb. 5, 2009

(87) PCT Pub. No.: WO2008/018324
PCT Pub. Date: Feb. 14, 2008

(65) Prior Publication Data
US 2010/0166078 A1    Jul. 1, 2010

(30) Foreign Application Priority Data
Aug. 8, 2006    (JP) ................................. 2006-216146

(51) Int. Cl.
*H04N 7/12*        (2006.01)
(52) U.S. Cl.
USPC .................................... 375/240.23; 375/240
(58) Field of Classification Search
None
See application file for complete search history.

(56) References Cited

U.S. PATENT DOCUMENTS 5,469,273 A * 11/1995 Demura ........................ 382/244
5,839,100 A * 11/1998 Wegener ...................... 704/220
6,038,256 A * 3/2000 Linzer et al. .............. 375/240.12
6,075,918 A * 6/2000 Strongin et al. ............... 386/326
6,310,915 B1 * 10/2001 Wells et al. .............. 375/240.03
6,556,627 B2 * 4/2003 Kitamura et al. ........ 375/240.26

(Continued)

FOREIGN PATENT DOCUMENTS

JP   2003-259370    9/2003
JP   2004-135251    4/2004
JP   2005-070938    3/2005
JP   2006-140758    6/2006

OTHER PUBLICATIONS

T. Wiegand, at al., "Overview of H.264/AVC Video Coding Standard," Jul. 2003, IEEE Transactions on Circuits and Systems for Video Technology, vol. 13, No. 7, pp. 560-576.*

(Continued)

*Primary Examiner* — Jung Kim
*Assistant Examiner* — Robert Leung
(74) *Attorney, Agent, or Firm* — Wenderoth, Lind & Ponack, L.L.P.

(57) ABSTRACT

An image coding apparatus reduces arithmetic processing and includes an intermediate stream generating unit generating an intermediate stream, by generating an intermediate code from image data, coding header information among coding conditions for image coding, and synthesizing the generated intermediate code and the coded header information. The image coding apparatus also includes a coded stream generating unit outputting a coded stream, by performing variable length coding on the intermediate code included in the intermediate stream to generate coded image data, and synthesizing the generated coded image data and the header information, and includes a parameter information extracting unit extracting, from among the coding conditions, parameter information required for performing variable length coding on the intermediate code. The coded stream generating unit generates the coded image data by performing the variable length coding on the intermediate code using the parameter information extracted by the parameter information extracting unit.

2 Claims, 9 Drawing Sheets

(56) References Cited

U.S. PATENT DOCUMENTS

| | | | |
|---|---|---|---|
| 2001/0008544 A1* | 7/2001 | Ishiyama | 375/240.12 |
| 2002/0090142 A1* | 7/2002 | Igarashi et al. | 382/246 |
| 2002/0114397 A1* | 8/2002 | Todo et al. | 375/240.29 |
| 2003/0133512 A1* | 7/2003 | Moni et al. | 375/246 |
| 2004/0120404 A1* | 6/2004 | Sugahara et al. | 375/240.23 |
| 2004/0243817 A1* | 12/2004 | Hasegawa et al. | 713/193 |
| 2005/0012647 A1* | 1/2005 | Kadono et al. | 341/67 |
| 2005/0062746 A1 | 3/2005 | Kataoka et al. | |
| 2005/0105883 A1* | 5/2005 | Holcomb et al. | 386/69 |
| 2005/0249289 A1 | 11/2005 | Yagasaki et al. | |
| 2006/0104527 A1 | 5/2006 | Koto et al. | |

OTHER PUBLICATIONS

International Search Report issued in the International (PCT) Application of which the present application is the U.S. National Stage, Oct. 26, 2007.

* cited by examiner

VARIABLE LENGTH CODING APPARATUS, AND METHOD AND INTEGRATED CIRCUIT OF THE SAME

TECHNICAL FIELD

The present invention relates to an image coding apparatus which compression-codes moving picture data, and particularly to a coding apparatus adaptable to the H.264/AVC coding scheme.

BACKGROUND ART

Data volume of digital video information is expanding due to the practical application of hi-vision broadcasts and so on. Such expansion of data volume is particularly significant in moving picture digital information, and image compression techniques for allowing efficient distribution through the media such as broadcasting or Digital Versatile Discs (DVDs) have been standardized. For example, MPEG2, which is adopted for satellite and terrestrial digital hi-vision broadcasting, is an example of such image compression techniques.

The standard for image compression techniques has been developing into a standard that allows realization of higher compression rates, accompanying improvements in information processing abilities of computers. H. 264/AVC is a standard for the next video compression techniques after MPEG2, and one of its characteristics is entropy coding (variable length coding). In entropy coding in accordance with H. 264/AVC, the following methods are provided: Context-Adaptive Binary Arithmetic Coding (CABAC) and Context-Adaptive Variable Length Coding (CAVLC).

One of the characteristics of entropy coding by CABAC is to include processing of: binarization for converting multi-value information to be coded, known as syntax, into binary data, and arithmetic coding that is performed based on the appearance probability of 0/1 per bit with reference to the context calculated with respect to the binary data converted by the binarization. In arithmetic coding by CABAC, processing is performed on a per-bit basis because the appearance probability is simultaneously updated per context, so that the operation speed is usually 1 bit/1 clock.

FIG. 1 is a block diagram showing a configuration of a conventional image coding apparatus equipped with a CABAC arithmetic coding function. A conventional image coding apparatus 10 shown in the figure is an apparatus which codes image data 12, and includes: a source coding unit 14, a control unit 18, an intermediate stream generating unit 30, a buffer 32, and a coded stream generating unit 34.

The source coding unit 14 performs predetermined processing on the image data 12, and outputs image-processed data that is the data after processing. Here, the "image data" 12 is moving picture data including luminance and color difference per pixel in a picture group. In addition, a specific example of the processing performed by the source coding unit 14 is: motion prediction, intra prediction, Discrete Cosine Transform (DCT), and quantization.

The control unit 18 controls the source coding unit 14, the intermediate stream generating unit 30, and the coded stream generating unit 34.

The intermediate stream generating unit 30 binarizes source-coded information (hereinafter, referred to as "source-coded image data") that is outputted by the source coding unit 14. The intermediate stream generating unit 30 includes: an intermediate code generating unit 40, a header information coding unit 42, and a synthesizing unit 44.

The intermediate code generating unit 40 generates information obtained by binarizing the source-coded image data per slice (hereinafter, referred to as "intermediate code"). The header information coding unit 42 generates coded header information. The "header information" includes: Sequence Parameter Set (SPS), Picture Parameter Set (PPS), and a slice header. In addition, the term simply referred to as "header information" hereinafter means the coded header information. The synthesizing unit 44 generates an intermediate stream 50 that is a synthesis of the intermediate code and the header information.

FIG. 2 is a diagram showing conventional information included in an intermediate stream 50. As the figure shows, the intermediate stream 50 includes header information, that is, SPS 22, PPS 24, a slice header 26, and an intermediate code 52. The header information in the intermediate stream 50 is coded by the header information coding unit 42, and the intermediate code 52 is binarized information generated by the intermediate code generating unit 40.

The buffer 32 is a storage unit which holds the intermediate stream 50 outputted from the synthesizing unit 44 of the intermediate stream generating unit 30.

Meanwhile, the processing of image compression is often performed in units of what is known as a macroblock obtained by dividing a picture constituting a moving picture, that is, in units of a pixel group made up of, for example, vertical 16 by horizontal 16 pixels. For example, in performing pipeline processing, pipelines usually operate on a per-macroblock basis.

The code amount in the compression of one macroblock depends on the status of pixels included in the macroblock. Normally, the code amount is small for a macroblock including uniform pixel values, whereas the code amount is large for a macroblock including pixels having large variations.

As described earlier, the operation speed of arithmetic coding is 1 bit/1 clock. In some cases, it is not possible to process one macroblock within an average macroblock processing time (=1/number of macroblocks coded per unit time) when the code amount of the macroblock is significantly large. When such a status continues, the data with which arithmetic coding cannot be started is stored as waiting data, and thus a buffer is usually provided for holding the data waiting for arithmetic coding. In the case of H. 264/AVC, the buffer requires a capacity for holding the data equivalent to maximum 2 pictures.

The technique described in Patent Reference 1 discloses a method for asynchronously performing, in the processing for coding the inputted image data 12, variable length coding and processing other than the variable length coding, by temporarily storing in the buffer 32 an intermediate code uniquely corresponding to a variable length code and performing variable length coding on the intermediate code.

The coded stream generating unit 34 obtains the intermediate stream 50 from the buffer 32, and generates to output a coded stream 20 by performing arithmetic coding on the obtained intermediate stream 50. Here, information included in the coded stream 20 shall be described with reference to FIG. 3.

FIG. 3 is a diagram showing information included in the coded stream 20. As the figure shows, the coded stream 20 includes: header information, that is, SPS 22, PPS 24 and a slice header 26, and coded image data 28. Here, the "coded image data" 28 is information obtained by performing variable length coding on the intermediate code per slice.

The coded stream generating unit 34 includes: a stream input control unit 60, a header information decoding unit 62, a parameter information register 64, a variable length coding unit 66, and a synthesizing unit 68.

The stream input control unit 60 obtains the intermediate stream 50 from the buffer 32.

The header information decoding unit 62 decodes the intermediate stream 50 and extracts parameter information included in header information.

Here, the "parameter information" is information required for performing variable length coding on the intermediate code, out of information included in header information. Specific examples of parameter information can be: "pic width in MBs" and "pic height in MBs", "Slice QPy", "cabac_init_idc", "slice_type", and so on in H264/AVC.

A parameter information register 64 is a storage unit for temporarily holding the parameter information extracted by the header information decoding unit 62.

The variable length coding unit 66 obtains the intermediate code 52 and the parameter information held by the parameter information register 64, and performs variable length coding on the intermediate code 52.

The synthesizing unit 68 outputs the coded stream 20, which is a synthesis of the header information and the coded data on which variable length coding has been performed by the variable length coding unit 66.

Patent Reference 1: Japanese Unexamined Patent Application Publication No. 2003-259370.

DISCLOSURE OF INVENTION

Problems that Invention is to Solve

However, the conventional image coding apparatus 10 has problems of increase in arithmetic processing and expansion in circuit size of Large Scale Integration (LSI).

In the conventional example, when information after binarization is a stream, it is necessary to perform, prior to variable length coding, processing for decoding on the intermediate stream and processing for extracting parameter information from the decoded intermediate stream. That is, in arithmetic coding in H.264/AVC, it is necessary to decode header information and extract parameter information before performing arithmetic coding on the intermediate code.

For reasons as described above, in the conventional example, the intermediate stream should be decoded from the top at the coded stream generating unit, which necessitates provision of a decoding process and an LSI circuit for the decoding process, which necessity results in increase in the amount of arithmetic processing and expansion in LSI circuit size.

The present invention is conceived in view of the above problems, and it is an object of the present invention to provide an image coding apparatus which makes it possible to reduce arithmetic processing and scale down the LSI circuit.

Means to Solve the Problems

To achieve the above object, the image coding apparatus according to the present invention is an image coding apparatus which includes: an intermediate stream generating unit that generates an intermediate stream, by generating an intermediate code from image data, coding header information included in coding conditions for image coding, and synthesizing the generated intermediate code and the coded header information; and a coded stream generating unit that outputs a coded stream, by performing variable length coding on the intermediate code included in the intermediate stream generated by the intermediate stream generating unit so as to generate coded image data, and synthesizing the generated coded image data and the header information coded by the intermediate stream generating unit, and the image coding apparatus includes a parameter information extracting unit which extracts parameter information from among coding conditions that are not coded, the parameter information being required when the coded stream generating unit performs the variable length coding on the intermediate code, and the coded stream generating unit generates the coded image data by performing the variable length coding on the intermediate code using the parameter information extracted by the parameter information extracting unit.

Thus, the parameter information is extracted from the coding conditions that are not coded. It is therefore no longer necessary to decode coding conditions that are coded in order to extract the parameter information. Accordingly, this makes it possible to reduce the processing for image coding.

It is preferable that the intermediate stream generating unit should include the parameter information extracting unit and synthesize, into the intermediate stream, the parameter information extracted by the parameter information extracting unit.

Thus, the parameter information is extracted from the coding conditions for image coding, and the parameter information is synthesized to the intermediate stream. This makes it possible to readily obtain, from the intermediate stream, the parameter information for performing the variable length coding on the intermediate code, thereby making it possible to reduce the processing for image coding.

It is also preferable that the intermediate stream generating unit should generate the intermediate stream to which a start code is added at a position immediately preceding the parameter information, and that the coded stream generating unit should extract the parameter information from the intermediate stream by detecting the start code added to the intermediate stream.

Thus, the start code is added at the position immediately preceding the parameter information. This makes it possible to readily find the parameter information, thereby making it possible to reduce the processing for image coding.

It is further preferable that the start code should have a same format as a start code of a Network Abstraction Layer (NAL) unit.

Thus, the start code added into the intermediate code has the same format as the start code of the NAL unit. With this, it becomes possible to detect the start code added into the intermediate code by using a unit which detects the start code of the NAL unit included in a general image coding apparatus. This makes it possible to detect the start code added into the intermediate code at high speed without adding any function to the general image coding apparatus.

It is further preferable that the coded stream generating unit should obtain, directly from the parameter information extracting unit, the parameter information extracted by the parameter information extracting unit.

Thus, the coded stream generating unit directly obtains and performs variable length coding on the generated parameter information. This makes it possible to readily obtain parameter information for performing the variable length coding on the intermediate code, thereby making it possible to reduce the processing for image coding.

It is further preferable that the intermediate stream generating unit should generate the intermediate stream to which a start code is added at a position immediately preceding the intermediate code, and that the coded stream generating unit should extract the intermediate code from the intermediate stream by detecting the start code added to the intermediate stream.

Thus, the image coding apparatus according to the present invention adds the start code at the position immediately preceding the intermediate code. This facilitates the detection of the intermediate code, thereby making it possible to further reduce the processing for image coding.

It is further preferable that the start code should have a same format as a start code of a Network Abstraction Layer (NAL) unit.

Thus, the start code added into the intermediate code has the same format as the start code of the NAL unit. With this, it becomes possible to detect the start code added into the intermediate code at high speed, without any function being added to the general image coding apparatus.

Note that the present invention can be realized not only as such an image coding apparatus or an image coding integrated circuit which includes such characteristic units but also as an image coding method which includes, as steps, characteristic units included in the image coding apparatus, and also as a program causing a computer to function as characteristic units included in the image coding apparatus. Furthermore, such a program can be distributed through a recoding medium such as a Compact Disc Read Only Memory (CD-ROM) or the communication network such as the Internet.

Effects of the Invention

According to the present invention, it becomes possible to reduce arithmetic processing in image coding, and to scale down the LSI circuit for image coding.

NUMERICAL REFERENCES

Figure 1:
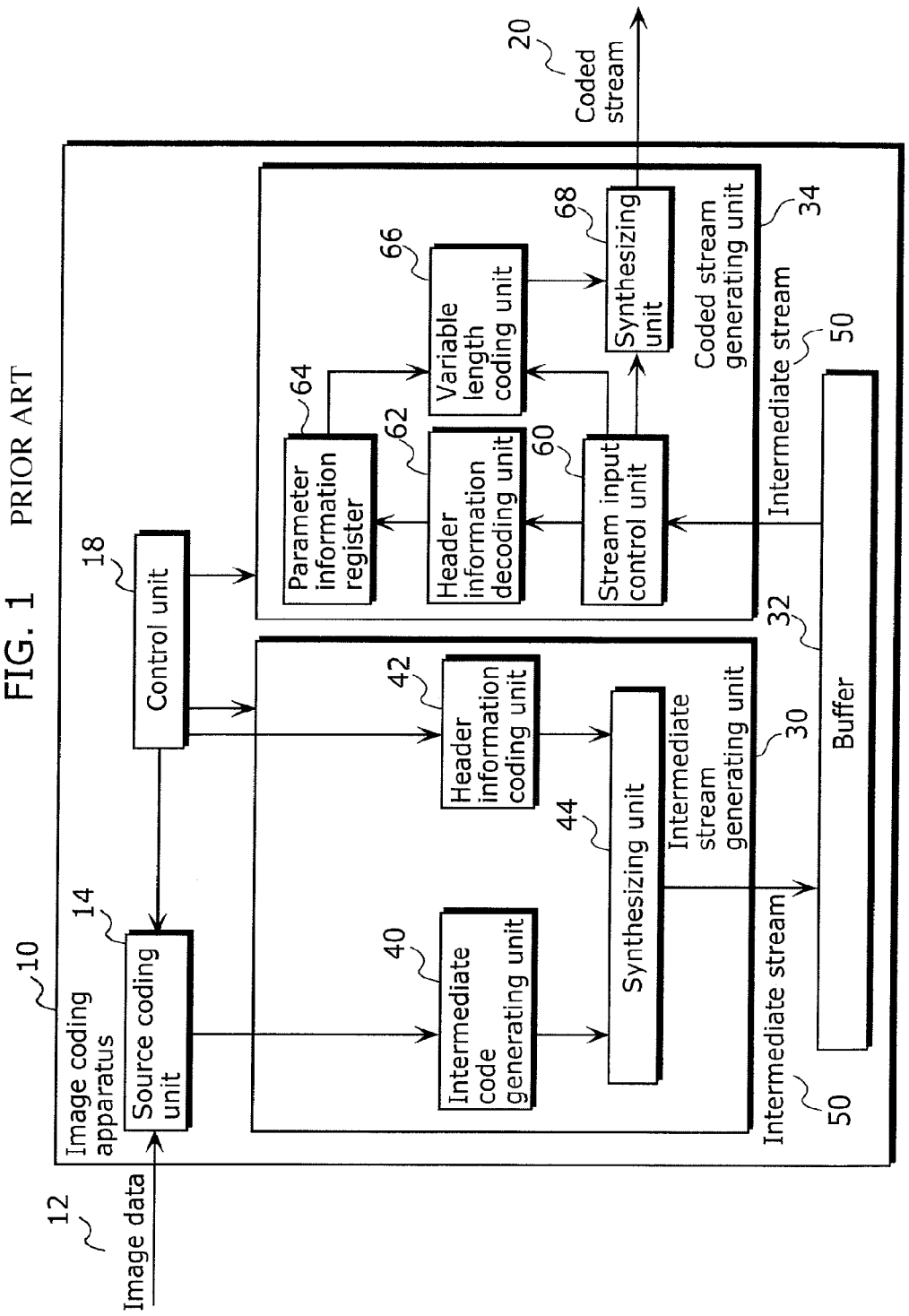
FIG. 1 is a block diagram showing a configuration of a conventional image coding apparatus equipped with a CABAC arithmetic coding function.
Figure 2:
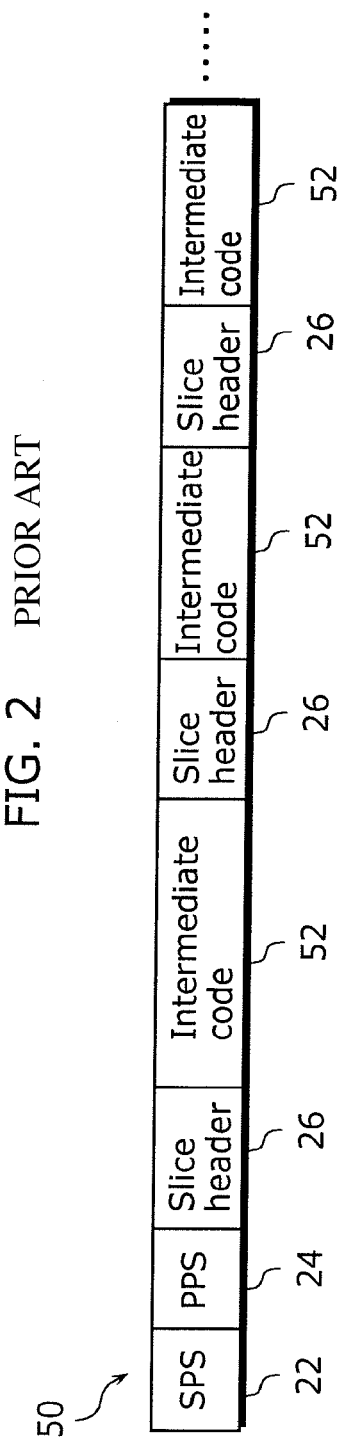
FIG. 2 is a diagram showing conventional information included in an intermediate stream.

12 Image data
14 Source coding unit
20 Coded stream
40 Intermediate code generating unit
42 Header information coding unit
64, 264 Parameter information register
66 Variable length coding unit
68 Synthesizing unit
100 Image coding apparatus
118, 218 Control unit
130 Intermediate stream generating unit
132, 232 Buffer
134 Coded stream generating unit
140 Parameter information extracting unit
144, 244 Synthesizing unit
150, 250 Intermediate stream
160, 260 Stream input control unit
220 Parameter information buffer

BEST MODE FOR CARRYING OUT THE INVENTION

Hereinafter, embodiments of an image coding apparatus according to the present invention shall be described with reference to the drawings.

First Embodiment

First, a first embodiment of the present invention shall be described with reference to FIGS. 4 to 6.

Figure 4:
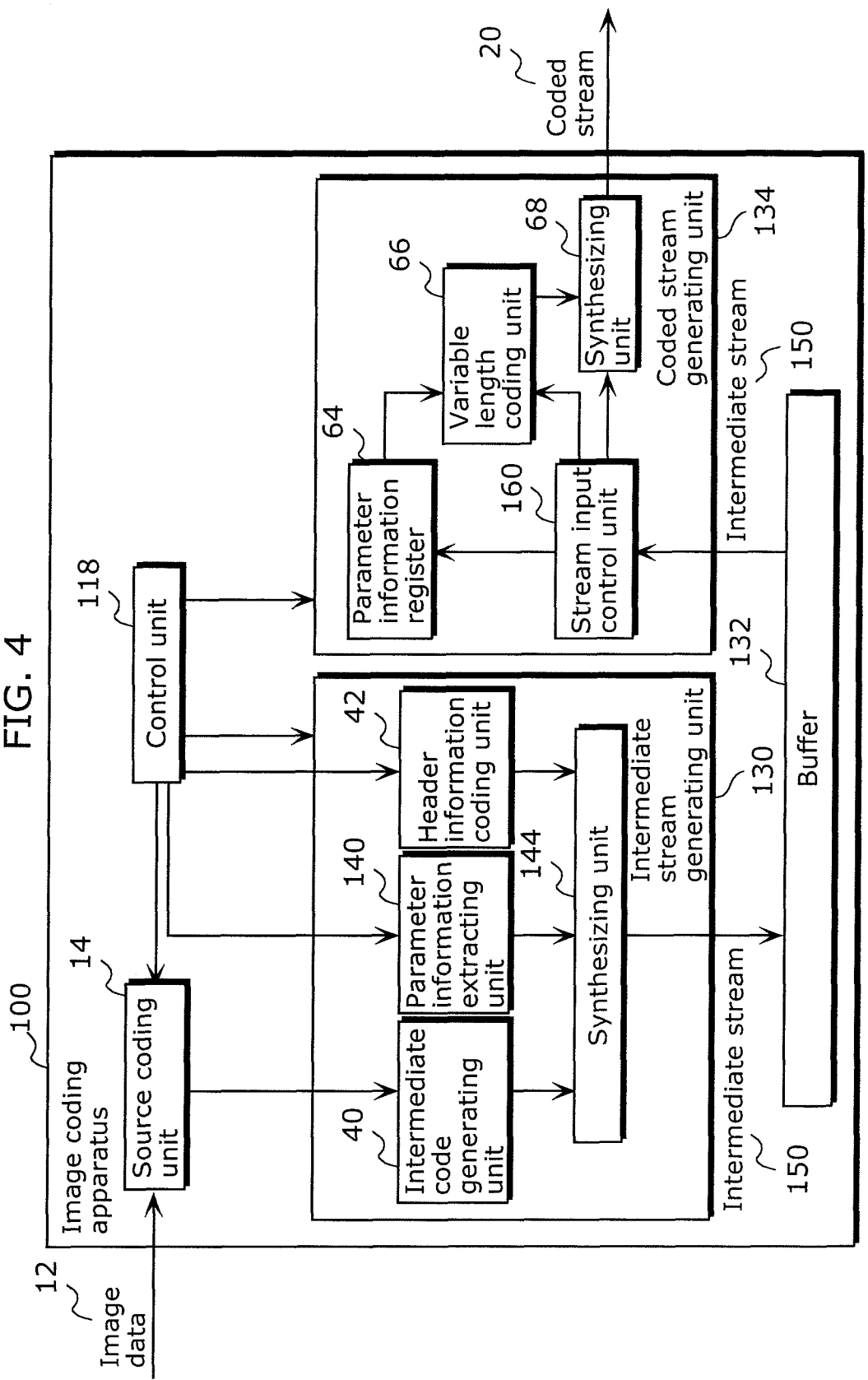
FIG. 4 is a block diagram showing a configuration of an image coding apparatus in a first embodiment of the present invention.

FIG. 4 is a block diagram showing a configuration of an image coding apparatus 100 in the first embodiment of the present invention. The image coding apparatus 100 is an apparatus which outputs a coded stream 20 by performing image-compression coding including variable length coding on image data 12 that is inputted, and includes: a source coding unit 14, a control unit 118, an intermediate stream generating unit 130, a buffer 132, and a coded stream generating unit 134. Here, the same numerals are given to units having the same functions as the respective units included in a conventional image coding apparatus 10 shown in FIG. 1, and thus the description thereof in this figure shall be omitted.

The control unit 118 controls: a source coding unit 14, an intermediate stream generating unit 130, and a coded stream generating unit 134.

The intermediate stream generating unit 130 includes: an intermediate code generating unit 40, a header information coding unit 42, a parameter information extracting unit 140, and a synthesizing unit 144.

The intermediate code generating unit 40 obtains data, which is outputted by the source coding unit 14 after the source coding unit 14 performs predetermined processing on image data 12, that is, source-coded image data, for example, and binarizes the source-coded image data.

The parameter information extracting unit 140 extracts parameter information from coding conditions for image coding that are outputted by the control unit 118.

A header information coding unit 42 codes the coding conditions for image coding outputted by the control unit 118, and outputs the coded coding conditions as header information.

The synthesizing unit 144 generates an intermediate stream 150 in which an intermediate code, header information, parameter information, and a unique start code indicating the start position of the parameter information are synthesized.

Here, the unique start code is, for example, "000001" in hexadecimal.

Generally, a slice header and an intermediate code are included in one Network Abstraction Layer (NAL) unit; therefore, for obtaining the intermediate code to be arithmetic-coded, the slice header should be decoded from the top, so as to judge where the intermediate stream starts. Such generation of the intermediate stream 150 including a unique start code makes it possible to obtain an intermediate code to be arithmetic-coded without decoding the slice header.

Figure 5:
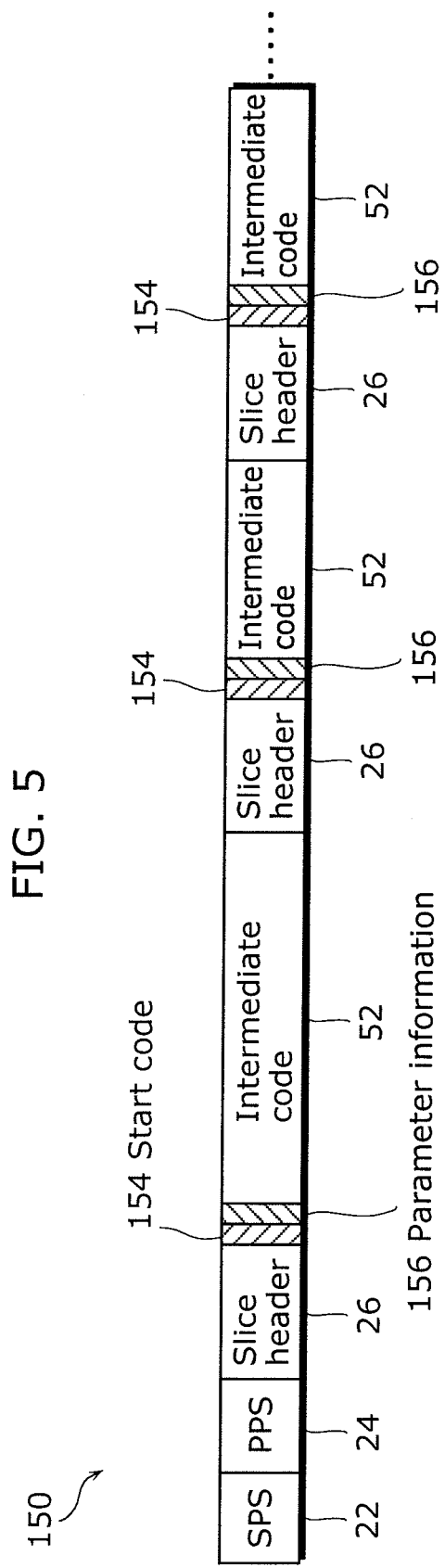
FIG. 5 is a diagram showing information included in an intermediate stream in the first embodiment.

FIG. 5 is a diagram showing information included in the intermediate stream 150 in the first embodiment. As the figure shows, the intermediate stream 150 includes: header information, that is, SPS 22, PPS 24, and a slice header 26; an intermediate code 52: a start code 154; and parameter information 156. The header information of the intermediate stream 150 is coded by the header information coding unit 42. In other words, according to H264/AVC, the intermediate code 52 is data included in slice_data( ), and SPS 22, PPS 24, and the slice header 26 are data included in other than slice_data( ).

The intermediate code 52 is binary information generated by the intermediate code generating unit 40. The start code 154 is information that is added by the synthesizing unit 144 at a position immediately preceding the parameter information 156. The parameter information 156 is information required for performing variable-length coding on the intermediate code 52, extracted by the parameter information extracting unit 140 and added by the synthesizing unit 144 at a position immediately preceding the intermediate code 52. The parameter information 156 is not coded. The parameter information 156 is information having a fixed length and includes, for example: "pic width in MBs" or "pic height in MBs", "Slice QPy", "cabac_init_idc", and "slice_type".

Thus, the intermediate stream 150 includes the start code 154. This enables the coded stream generating unit 134 described below to judge, without decoding the intermediate stream, a boundary between: the intermediate code 52 that is information to be variable-length coded and the parameter information 156 that is information required for performing variable-length coding on the intermediate code 52; and the slice header 26 included in the same NAL unit. In addition, the intermediate stream 150 includes parameter information that is not coded. This enables the coded stream generating unit 134 described below to obtain, without decoding the intermediate stream, a parameter required for performing variable-length coding on the intermediate code 52.

By generating such an intermediate stream 150, the coded stream generating unit 134 need not decode the header information, thereby making it possible to reduce arithmetic processing in image coding, and to scale down an LSI circuit for image coding.

Note that the start code 154 may also be added by the header information coding unit 42, in place of the synthesizing unit 144, to the bottom of the header information extracted by the header information coding unit 42, or may also be added by the parameter information extracting unit 140, in place of the synthesizing unit 144, to the top of the parameter information 156 extracted by the parameter information extracting unit 140.

At this point, the description is return to FIG. 4.

The buffer 132 is a storage unit which holds the intermediate stream 150 outputted from the synthesizing unit 144 of the intermediate stream generating unit 130.

The coded stream generating unit 134 includes: a parameter information register 64, a variable length coding unit 66, a synthesizing unit 68, and a stream input control unit 160.

The parameter information register 64 is a storage unit which temporarily holds parameter information as with the parameter information register 64 included in the conventional image coding apparatus 10.

The stream input control unit 160 obtains the intermediate stream 50 from the buffer 132 as with the stream input control unit 160 included in the conventional image coding apparatus 10.

Furthermore, the stream input control unit 160 of the present embodiment detects the start code 154 included in the intermediate stream 50, and obtains parameter information 156 succeeding the detected start code 154. The stream input control unit 160 stores the obtained parameter information 156 into the parameter information register 64.

Here, the stream input control unit 160 in general includes a dedicated detection processing unit for detecting the start code of the NAL unit at high speed. As described earlier, the unique start code indicating the start position of the parameter information is "000001" (hexadecimal), which is the same as the start code of the NAL unit. This allows the detection of the unique start code by using the dedicated detection processing unit. Therefore, the detection processing for the unique start code can be accelerated.

The variable length coding unit 66, as with the variable length coding unit 66 included in the conventional image coding apparatus 10, obtains the intermediate code 52 and the parameter information 156 held by the parameter information register 64, and performs variable length coding on the intermediate code 52.

The synthesizing unit 68, as with the synthesizing unit 68 included in the conventional image coding apparatus 10, outputs the coded stream 20 that is obtained by synthesizing the header information 156 and the coded data that has been variable-length coded by the variable length coding unit 66.

The stream input control unit 160 obtains the intermediate stream 150 from the buffer 132, extracts parameter information 156 from the obtained intermediate stream 150, and causes the parameter information register 64 to hold the extracted parameter information 156.

Figure 6:
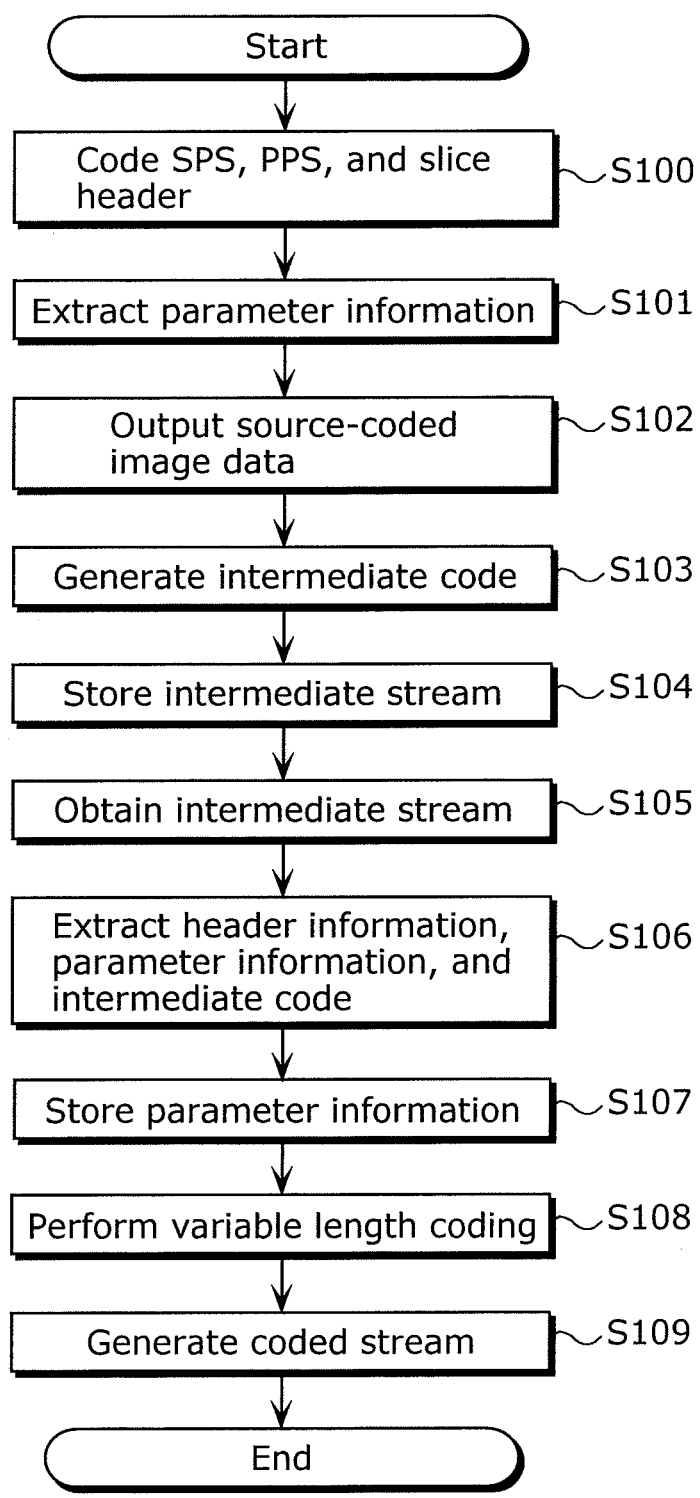
FIG. 6 is a flowchart of processing performed by the image coding apparatus in the first embodiment of the present invention.

FIG. 6 is a flowchart of the processing performed by the image coding apparatus 100 in the first embodiment of the present invention.

The control unit 118 instructs to code the header information by assigning the coding conditions for image coding to the header information coding unit 42. According to the instruction from the control unit 118, the header information coding unit 42 outputs header information that includes SPS 22, PPS 24, and a slice header 26 (S100).

The control unit 118 instructs to output the parameter information 156 by assigning the coding conditions for image coding to the parameter information extracting unit 140. According to the instruction from the control unit 118, the control unit 140 outputs the parameter information 156 required for performing variable-length coding on the intermediate code 52. (S101).

The control unit 118 instructs the source coding unit 14 to code image data. The source coding unit 14 outputs source-coded image data for an input of the image data 12 (S102).

The intermediate code generating unit 40 generates the intermediate code 52 (S103).

The synthesizing unit 144 synthesizes the header information obtained from the header information coding unit 42, the parameter information 156 obtained from the parameter information extracting unit 140, and the intermediate code 52 obtained from the intermediate code generating unit 40, and also stores into the buffer 132, the intermediate stream 150 shown in FIG. 5, which is generated by adding the start code 154 (S104).

In response to the instruction issued by the control unit 118 which has detected that an intermediate code having an amount equivalent to one slice has been generated, the stream input control unit 160 obtains the intermediate stream 150 from the buffer 132 (S105).

The stream input control unit 160 detects the start code 154 of the intermediate stream 150, thereby extracting the parameter information 156 with respect to each slice starting at the point as well as extracting header information and the intermediate code 52 (S106).

The stream input control unit 160 stores extracted parameter information into the parameter information register 64 (S107).

The variable length coding unit 66 performs variable length coding on the intermediate code 52 by obtaining, from the stream input control unit 160, the intermediate code 52 extracted by the stream input control unit 160 while obtaining, from the parameter information register 64, the parameter information of a slice corresponding to the obtained intermediate code 52.

Figure 3:
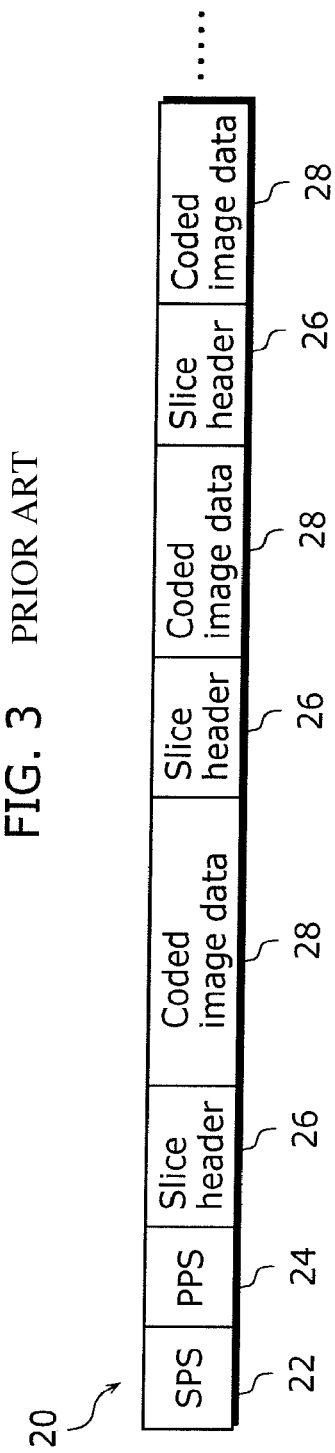
FIG. 3 is a diagram showing information included in the coded stream.

The synthesizing unit 68 generates a coded stream 20 obtained by synthesizing, as shown in FIG. 3, the header information and the intermediate code 52 extracted by the stream input control unit 160, and the coded image data 28 coded by the variable length coding unit 66 (S109), and completes the processing with an output.

Note that the header information coding unit 42, the parameter information extracting unit 140, and the stream input control unit 160 have been assumed to start processing in response to the instructions issued by the control unit 118. These instructions may also be implemented by the control unit 118 outputting unique commands to respective units.

Specifically, for example, an extraction control command that is a command provided to the parameter information extracting unit 140 is outputted from the control unit 118 to the parameter information extracting unit 140 either immediately before the source coding unit 14 starts processing or when the header information coding unit 42 generates the header information.

Here, the coding conditions for image coding performed in the parameter information extracting unit 140 and the header information coding unit 42 are determined prior to the processing performed in the source coding unit 14, and held, for example, by the control unit 118. Therefore, the extraction control command may be outputted, along with the coding conditions with the timing described above, from the control unit 118 to the parameter information extracting unit 140. Alternatively, another applicable method is to previously provide the coding conditions to the parameter information extracting unit 140 and cause the control unit 118 to output only the extraction control command with the timing described above.

In addition, a hold control command that is a command provided to the stream input control unit 160 may cause the stream input control unit 160 to detect the start code 154, and to further perform a series of processing for storing the parameter information 156, which is discriminated and extracted based on the detected start code 154, into the parameter information register 64 (S106 and S107).

Furthermore, the hold control command that is a command provided to the stream input control unit 160 may be different from a detection control command that is a command to cause the stream input control unit 160 to detect the start code 154. In this case, the stream input control unit 160, having received the detection control command, detects the start code 154 of the intermediate stream 150 (first half of S106). Then, when the stream input control unit 160 notifies the control unit 118 that the start code 154 has been detected, the control unit 118 subsequently outputs the hold control command to the stream input control unit 160. Upon receiving the hold control command, the stream input control unit 160 extracts the parameter information 156 starting with the detected start code 154, and stores the extracted parameter information into the parameter information register 64 (second half of S106 and S107).

Note that there is a case where the same code as the start code 154 appears in the intermediate code 52 outputted in the coding processing in the first embodiment. For example, in the first embodiment, there is a case where "000001" (hexadecimal) appears within the intermediate code 52. For facilitating the distinction between such a code within the intermediate code 52 and the start code 154, an emulation prevention byte may be added to the code within the intermediate code 52. For example, when the same "000001" (hexadecimal) as the start code 154 appears within the intermediate code 52, emulation_prevention_three_byte ("03" in hexadecimal") may be inserted between "0000" and "01".

Note that the unique start code 154, assumed as the same "000001" (hexadecimal) as the start code of the NAL unit, may also be any one of "000000", "000002", "000003" and so on (but should be hexadecimal). In addition, two bytes succeeding the start code of the NAL unit are used for indicating the type of the NAL unit. However, the two bytes succeeding the start code of the NAL unit also include a value that is unused or undefined as the value indicating the type of the NAL unit. Assuming that such an unused or undefined value as "xx" (hexadecimal), the unique start code 154 and the succeeding two bytes are represented by "000001xx" (hexadecimal).

Second Embodiment

Figure 7:
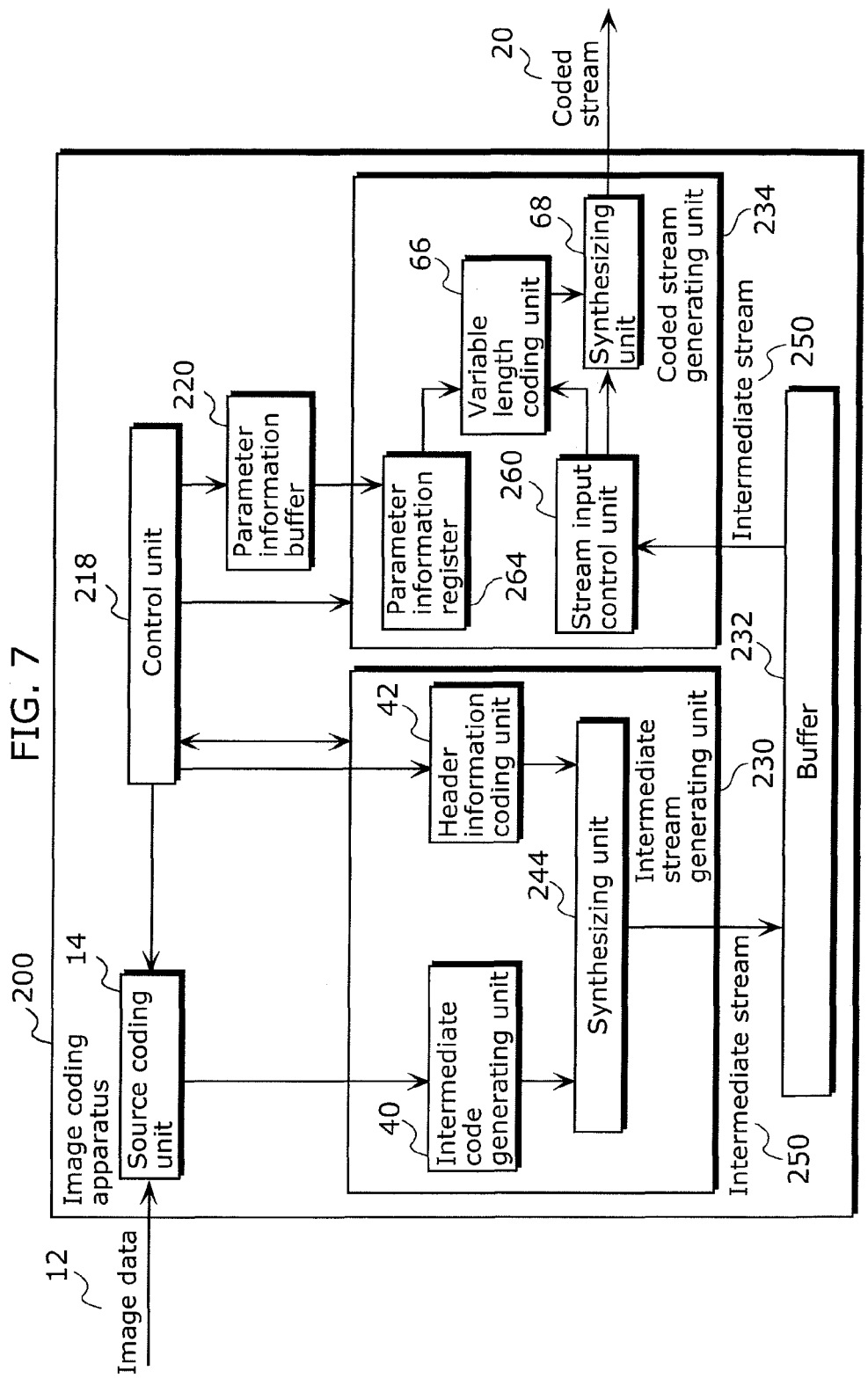
FIG. 7 is a block diagram showing a configuration of an image coding apparatus in a second embodiment of the present invention.

FIG. 7 is a block diagram showing a configuration of an image coding apparatus 200 in a second embodiment of the present invention. The image coding apparatus 200 is an apparatus which outputs a coded stream by performing image-compression coding including variable length coding on image data 12 that is inputted, and includes: a source coding unit 14, a control unit 218, a parameter information buffer 220, an intermediate stream generating unit 230, a buffer 232, and a coded stream generating unit 234. Here, the same numerals are given to units having the same functions as the respective units included in a conventional image coding apparatus 10 shown in FIG. 1, and thus the description thereof in this figure shall be omitted.

The control unit 218 controls the source coding unit 14, the intermediate stream generating unit 230, and the coded stream generating unit 234, and also, as a parameter information extracting unit, extracts to store parameter information into the parameter information buffer 220.

The parameter information buffer 220 is a buffer for temporarily holding the parameter information extracted from the header information by the control unit 218, that is, parameter information that is not coded.

The intermediate stream generating unit 230 includes: an intermediate code generating unit 40, a header information coding unit 42, and a synthesizing unit 244. The intermediate code generating unit 40 and the header information coding unit 42 have the same functions as the respective units that are assigned with the same numerals and included in the conventional image coding apparatus 10 that has been described with reference to FIG. 1. For this reason, the description of these respective units shall be omitted here.

The synthesizing unit 244 generates an intermediate stream 250 in which an intermediate code, header information, and a unique start code 254 indicating the start position of the intermediate code are synthesized. As in the first embodiment, the unique start code here is also assumed as "000001" (hexadecimal).

Figure 8:
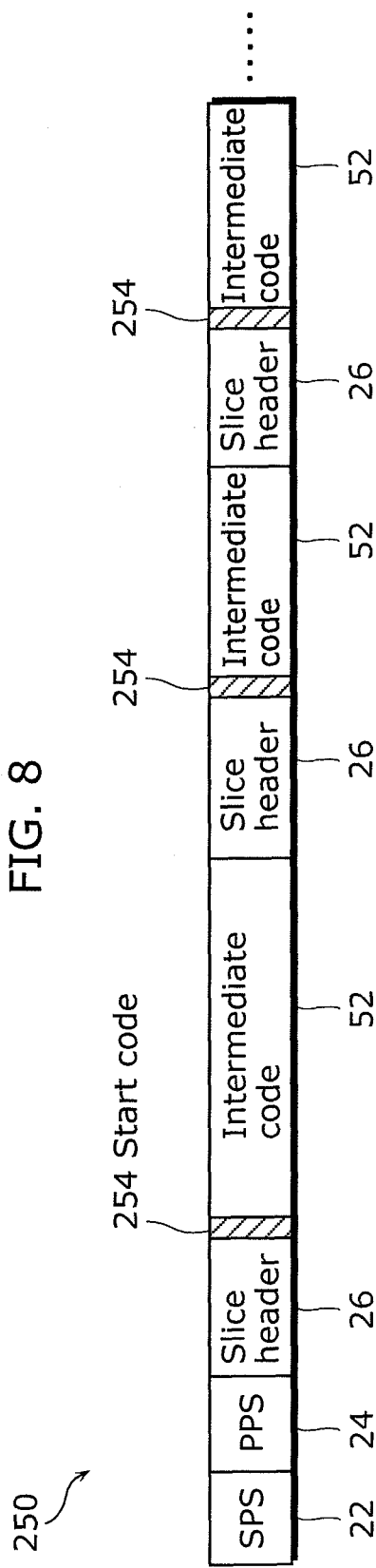
FIG. 8 is a diagram showing information included in an intermediate stream in the first embodiment.

FIG. 8 is a diagram showing information included in the intermediate stream 250 in the second embodiment. As the figure shows, the intermediate stream 250 includes: header information, that is, SPS 22, PPS 24, and a slice header 26, an intermediate code 52, and the start code 254. In other words, according to H264/AVC, the intermediate code 52 is data included in slice_data( ), and SPS 22, PPS 24, and the slice header 26 are data included in other than slice_data( ).

The header information of the intermediate stream 250 is coded by the header information coding unit 42. The intermediate code 52 is binary information generated by the intermediate code generating unit 40. The start code 254 is information added by the synthesizing unit 244 at a position immediately preceding the intermediate code 52.

Thus, the intermediate stream 250 includes the start code 254. This enables the coded stream generating unit 234 described below to judge, without decoding the intermediate stream 250, a boundary between the intermediate code 52 that is information to be variable-length coded and the slice header 26 included in the same NAL unit. This enables the coded stream generating unit 234 described below to obtain the intermediate code 52 without decoding the intermediate stream.

In addition, the parameter information buffer 220 holds parameter information that is not coded. This enables the coded stream generating unit 234 described below to obtain, without decoding the intermediate stream, the parameter information that is not coded from the parameter information buffer 220.

Therefore, by generating such an intermediate stream 250, the coded stream generating unit 134 need not decode the header information, thereby making it possible to reduce arithmetic processing in image coding, and to scale down an LSI circuit for image coding.

Note that the start code 254 may also be added by the header information coding unit 42, in place of the synthesizing unit 244, to the bottom of the header information extracted by the header information coding unit 42, or may also be added by the intermediate code 40, in place of the synthesizing unit 244, to the top of the intermediate code 52 extracted by the intermediate code generating unit 40.

The buffer 232 is a storage unit which holds the intermediate stream 250 outputted from the synthesizing unit 244 of the intermediate stream generating unit 230.

The coded stream generating unit 234 includes: a variable length coding unit 66, a synthesizing unit 68, a stream input control unit 260, and a parameter information register 264.

The stream input control unit 260 obtains the intermediate stream 250 from the buffer 232.

The parameter information register 264 obtains parameter information from the parameter information buffer 220 and temporarily holds, on its own, the obtained parameter information. In other words, the parameter information register 264 of the present embodiment has a storage unit which holds parameter information and a processing unit which obtains parameter information from the parameter information buffer 220.

Note that the parameter information may be obtained by the control unit 218 from the parameter information buffer 220, instead of being obtained by the parameter information register 264, so as to be stored in the parameter information register 264.

Figure 9:
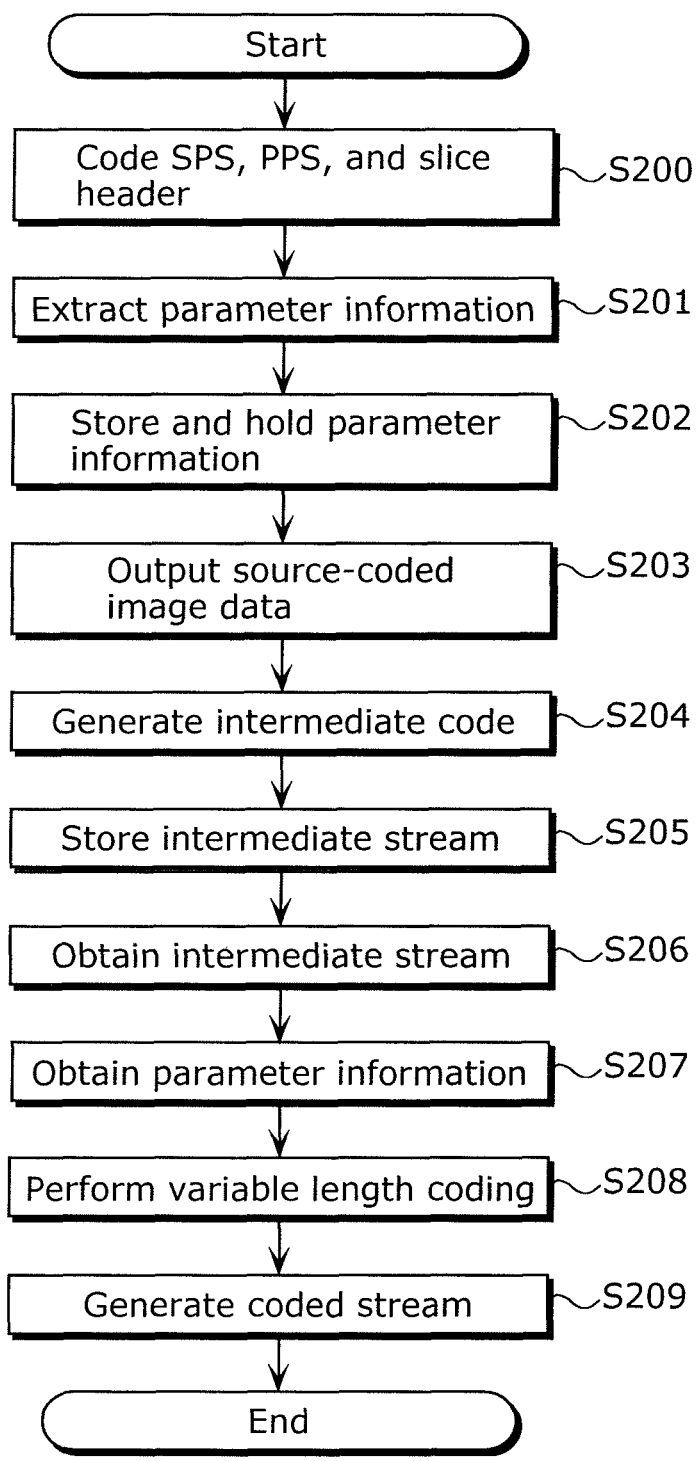
FIG. 9 is a flowchart of processing performed by the image coding apparatus in the second embodiment of the present invention.

FIG. 9 is a flowchart of the processing performed by the image coding apparatus 200 of the second embodiment of the present invention.

The control unit 218 instructs to code the header information by assigning coding conditions for image coding to the header information coding unit 42. According to the instruction from the control unit 218, the header information coding unit 42 outputs header information that includes SPS 22, PPS 24, and a slice header 26 (S200).

The control unit 218 extracts parameter information of image data to be subsequently processed at the intermediate code generating unit 40, so as to generate parameter information complied per slice (S201).

The control unit 218 stores the generated parameter information into the parameter information buffer 220. The parameter information register 264 obtains parameter information from the parameter information buffer 220 and also holds, on its own, the obtained parameter information (S202).

The control unit 218 instructs the source coding unit 14 to code image data. The source coding unit 14 outputs source-coded image data for an input of the image data 12 (S203).

The intermediate code generating unit 40 generates the intermediate code 52 (S204).

The synthesizing unit 244 synthesizes header information obtained from the header information coding unit 42 and the intermediate code obtained from the intermediate code generating unit 40, and also stores into the buffer 232, the intermediate stream 250 shown in FIG. 8, which has been generated by adding the start code 254 (S205).

In response to the instruction issued by the control unit 218 which has detected that an intermediate code having an amount equivalent to one slice has been generated, the stream input control unit 260 obtains the intermediate stream 250 from the buffer 232 (S206).

The variable length coding unit 66 obtains, from the parameter information register 264, parameter information corresponding to the intermediate code to be subsequently processed by the variable length coding unit 66 (S207).

The stream input control unit 260 detects the start code 254 of the intermediate stream 250, and extracts the intermediate code 52 included in the intermediate stream 250. The variable length coding unit 66 obtains, from the stream input control unit 260, the intermediate code 52 of a slice corresponding to the obtained parameter information, and performs variable length coding on the obtained intermediate code 52 (S208).

The synthesizing unit 68 generates a coded stream 20 by synthesizing, as shown in FIG. 3, the header information that the stream input control unit 260 has extracted by detecting the start code 254 of the intermediate stream 250, and the coded image data 28 coded by the variable length coding unit 66 (S209), and completes the processing with an output.

Thus, since the start code 254 is included in the intermediate stream 250, the coded stream generating unit 234 can judge, without decoding the header information, a boundary between the coded slice header 26 and the intermediate code 52 included in the same NAL unit. This makes it possible to reduce the processing performed at the coded stream generating unit 234, and to scale down an LSI circuit.

Note that the control unit 218 of the second embodiment has been assumed to generate parameter information by controlling respective units, based on the coding conditions for image coding, and also to store the generated parameter information into the parameter information buffer, but the control unit 218 may also be assumed to control the respective units exclusively, with another unit generating parameter information. In this case, the unit generating the parameter information obtains coding conditions from the control unit 218, generates parameter information per slice based on the obtained coding conditions, and stores the generated parameter information into the parameter information buffer 220.

Furthermore, the generation of the parameter information may be executed, when executed by, for example, the control unit 218, by a unique command held in the control unit 218, and may also be executed, when executed by a parameter information generating unit other than the control unit 218, by a command issued from the control unit 218 to the parameter information generating unit. In addition, such a unique command may also be issued immediately before the source coding unit 14 starts processing.

Note that the processing performed by the header information coding unit 42 and the detection processing for the start code 254 performed by the stream input control unit 260 are assumed to be started, respectively, in response to the instructions issued by the control unit 218, but the processing may also be started without any instruction from the control unit 218. For example, the header information coding unit 42 may automatically start the processing when the control unit 218 instructs the source coding unit 14 to perform source coding, or the stream input control unit 260 may automatically obtain an intermediate stream to detect the start code 254 when the synthesizing unit 244 outputs the intermediate stream.

Note that the parameter information buffer 220 included in the image coding apparatus 200 of the second embodiment need not be a dedicated buffer but may also be a storage area included inside a Central Processing Unit (CPU) when the control unit 218 is embodied as the CPU.

Thus far, the image coding apparatus 100 according to the first embodiment and the image coding apparatus 200 according to the second embodiment of the present invention have been described, but the present invention is not limited to these embodiments.

For example, although it is assumed in the first embodiment that the start code 154 is added to the intermediate stream 150 by the synthesizing unit 144, the start code 154 may also be added by the parameter information extracting unit 140 to the top of the parameter information extracted by the parameter information extracting unit 140, or may also be added by the header information coding unit 42 to the bottom of the header information coded by the header information coding unit 42. In addition, as with the second embodiment, the start code 254 added to the intermediate stream 250 may also be added by the intermediate code generating unit 40 to the top of the intermediate code generated by the intermediate code generating unit 40, or may also be added by the header information coding unit 42 to the bottom of the header information coded by the header information coding unit 42.

In addition, for example, it is assumed in the first embodiment that the parameter information 156, when synthesized into the intermediate stream 150, is not coded and synthesized immediately after the start code 154, and it is assumed in the second embodiment that the parameter information 156 is not coded and stored into the parameter information buffer 220, and then the parameter information that is not coded is held by the parameter information register 264, but the parameter information may also be coded.

More specifically, in the first embodiment, the coded parameter information may also be synthesized immediately after the start code 154. In addition, in the second embodiment, the coded parameter information may also be held by the parameter information register 264 through the parameter information buffer 220.

This allows collective obtainment of parameter information from the intermediate stream 150 or the parameter information register 264, thereby making it possible to omit the decoding processing for detecting the parameter information.

Furthermore, for example, the processing performed by the image coding apparatus 100, shown in FIG. 9, according to the first embodiment and the processing performed by the image coding apparatus 200, shown in FIG. 9, according to the second embodiment may not necessarily be sequentially performed. That is, when each processing unit has a sufficient processing capacity, the processing may also be concurrently performed. For example, the processing performed by the intermediate stream generating unit 130 and the coded stream generating unit 134, or the processing performed by the intermediate stream generating unit 230 and the coded stream generating unit 234 may also be concurrently performed.

Furthermore, for example, when the image coding apparatus 100 according to the first embodiment or the image coding apparatus 200 according to the second embodiment is embodied with an integrated circuit, the image coding apparatus 100 or the image coding apparatus 200 may be embodied with one integrated circuit, or may also be embodied with plural integrated circuits.

INDUSTRIAL APPLICABILITY

The present invention is applicable to an image coding apparatus, an image coding method, and so on for asynchronously performing variable length coding and image processing before the variable length coding, and is particularly effective when arithmetic coding adopted in H. 264/AVC and so on is used in the variable length coding.

The invention claimed is:
1. An image coding apparatus comprising:
a source coding unit configured to receive image data that has not been compression coded, to perform predetermined processing to source encode the received image data and to output source-encoded image data;
an intermediate stream generating unit configured to receive the source-encoded image data from the source coding unit and to generate, from the received source-encoded image data, an intermediate stream comprising (i) header information generated by encoding an unencoded encoding condition and (ii) an intermediate code that is binary data obtained by binarizing the received source-encoded image data, the unencoded encoding condition being generated by performing the predetermined processing on the received image data;
a storage unit configured to (i) store parameter information, which is used to variable-length encode the intermediate code, from among a plurality of unencoded encoding conditions generated in the image coding apparatus and (ii) store the intermediate stream including at least the header information generated by encoding the unencoded encoding condition;
a variable length encoding unit configured to generate encoded image data by variable-length encoding the intermediate code by utilizing the parameter information stored in the storage unit, instead of using the unencoded encoding condition obtained by temporarily decoding the header information included in the intermediate stream stored in the storage unit; and
a synthesizing unit configured to generate an encoded stream by synthesizing the header information generated by the intermediate stream generating unit encoding the unencoded coding condition and the encoded image data generated by the variable length encoding unit.

2. The image coding apparatus according to claim 1,
wherein the header information and the intermediate code are described, in series, in a unit of encoding processed by the variable length coding unit,
wherein an identification code indicating that the intermediate code is stored next to the identification code is stored between the header information and the intermediate code, and
wherein the variable length coding unit is configured to obtain the identification code, so as to obtain and variable-length encode the intermediate code, instead of using the coding condition obtained by temporarily decoding the header information.

\* \* \* \* \*